US008125529B2

(12) United States Patent
Skoskiewicz et al.

(10) Patent No.: US 8,125,529 B2
(45) Date of Patent: Feb. 28, 2012

(54) CAMERA AIMING USING AN ELECTRONIC POSITIONING SYSTEM FOR THE TARGET

(75) Inventors: Andrzej Skoskiewicz, Menlo Park, CA (US); Kurt R. Zimmerman, Mountain View, CA (US); Masayoshi Matsuoka, Redwood City, CA (US); Justin Hedtke, Fremont, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 440 days.

(21) Appl. No.: 12/368,002

(22) Filed: Feb. 9, 2009

(65) Prior Publication Data

US 2010/0201829 A1 Aug. 12, 2010

(51) Int. Cl.
*H04N 5/232* (2006.01)
*H04N 7/00* (2011.01)
*H04N 7/18* (2006.01)
*G06K 9/00* (2006.01)
*G06G 7/76* (2006.01)

(52) U.S. Cl. ..................... 348/211.2; 348/116; 348/159; 382/104; 701/50

(58) Field of Classification Search .................. 348/113, 348/116, 118, 119, 120, 148, 159, 211.99, 348/211.2, 211.7; 382/104; 701/50, 213
See application file for complete search history.

(56) References Cited

U.S. PATENT DOCUMENTS 4,833,383 A 5/1989 Skarr et al.
(Continued)

*Primary Examiner* — John Villecco
(74) *Attorney, Agent, or Firm* — Perkins Coie LLP

(57) ABSTRACT

Vehicles, such as vehicles in an open-pit mine, are visually tracked. The location of a vehicle is determined using radio frequency signals, such as pseudolite transmissions of ranging signals. The camera is steered based on the location. For example, multiple cameras are directed automatically on a vehicle based on the vehicle position. Images from a plurality of perspectives are provided to resolve or prevent a problem. The directing may include zooming for better viewing of vehicles at different distances from the camera. The directing may be incorporated into a vehicle management system, such as a dispatch system. For example, a user selects a vehicle from a list of managed vehicles or a displayed map, and the cameras are steered to view the selected vehicle based on the position of the vehicle.

35 Claims, 6 Drawing Sheets

U.S. PATENT DOCUMENTS 4,924,507 A 5/1990 Chao et al.
4,942,538 A 7/1990 Yuan et al.
5,023,709 A 6/1991 Kita et al.
5,434,617 A 7/1995 Bianchi
5,434,621 A 7/1995 Yu
5,473,369 A 12/1995 Abe
5,513,854 A * 5/1996 Daver ............................ 700/91
5,521,843 A 5/1996 Hashima et al.
5,557,543 A 9/1996 Parsons
5,574,498 A 11/1996 Sakamoto et al.
5,617,335 A 4/1997 Hashima et al.
5,642,285 A 6/1997 Woo et al.
5,646,614 A 7/1997 Abersfelder et al.
5,714,999 A 2/1998 Jeong et al.
5,797,048 A 8/1998 Shiokama et al.
5,850,469 A 12/1998 Martin et al.
5,889,550 A 3/1999 Reynolds
5,982,420 A 11/1999 Ratz
6,005,610 A 12/1999 Pingali
6,141,611 A 10/2000 Mackey et al.
6,181,271 B1 1/2001 Hosaka et al.
6,362,875 B1 3/2002 Burkley
6,377,296 B1 4/2002 Zlatsin et al.
6,396,403 B1 5/2002 Haner
6,404,455 B1 6/2002 Ito et al.
6,507,366 B1 1/2003 Lee
6,650,360 B1 * 11/2003 Osen ............................ 348/157
6,657,584 B2 12/2003 Cavallaro et al.
6,690,978 B1 * 2/2004 Kirsch .......................... 701/213
6,720,879 B2 4/2004 Edwards
6,738,572 B2 5/2004 Hunter
6,744,403 B2 * 6/2004 Milnes et al. ............ 342/357.57
6,778,097 B1 * 8/2004 Kajita et al. ................ 340/12.5
6,809,760 B1 10/2004 Takagi et al.
6,879,910 B2 * 4/2005 Shike et al. .................. 701/208
6,990,681 B2 1/2006 Wang et al.
7,007,888 B2 3/2006 Brunson et al.
7,058,204 B2 6/2006 Hildreth et al.
7,064,776 B2 6/2006 Sumi et al.
7,139,662 B2 * 11/2006 Ericsson et al. ................ 701/50
7,140,574 B1 11/2006 Brunson et al.
7,149,325 B2 12/2006 Pavlidis et al.
7,242,423 B2 7/2007 Lin
7,339,525 B2 3/2008 Zimmerman et al.
7,492,262 B2 * 2/2009 Washington .................. 348/143
2002/0045987 A1 * 4/2002 Ohata et al. .................. 701/213
2002/0090217 A1 * 7/2002 Limor et al. .................. 396/429
2006/0022870 A1 * 2/2006 Zimmerman et al. ........ 342/464
2008/0186379 A1 * 8/2008 Ishigame et al. .............. 348/116
2009/0027500 A1 * 1/2009 Elangovan et al. ........... 348/159
2009/0262196 A1 * 10/2009 Salivar et al. ................ 348/159
2010/0231721 A1 * 9/2010 Meloche et al. .............. 348/159
2011/0013018 A1 * 1/2011 Leblond ........................ 348/143
2011/0050904 A1 * 3/2011 Anderson ..................... 348/157
2011/0071792 A1 * 3/2011 Miner .......................... 702/182

* cited by examiner

CAMERA AIMING USING AN ELECTRONIC POSITIONING SYSTEM FOR THE TARGET

BACKGROUND

The present invention relates to range or position determination. In particular, position information is used to aim a camera.

Global navigation satellite systems (GNSS) allow a receiver to determine a position from ranging signals received from a plurality of satellites. Different GNSS systems are available or have been proposed, such as the global positioning system (GPS), Galileo, or GLONASS. The GPS has both civilian and military applications. Different ranging signals are used for the two different applications, allowing for different accuracies in position determination.

Position is determined from code and/or carrier phase information. A code division multiple access code is transmitted from each of the satellites of the global positioning system. The spread spectrum code is provided at a 1 MHz modulation rate for civilian applications and a 10 MHz modulation rate for military applications. The code provided on the L1 carrier wave for civilian use is about 300 kilometers long. The codes from different satellites are correlated with replica codes to determine ranges to different satellites. A change in position of the satellites over time allows resolution of carrier phase ambiguity for greater accuracy in position determination.

In addition to satellite-based systems, land-based transmitters may be used for determining a range or position. For example, U.S. Pat. No. 7,339,525 discloses land-based transmitters for determining position in a mining environment. In open pit mines, a diversity of mobile equipment and vehicles interacts with each other on the same roads under various (and sometimes extreme) environmental conditions. The vehicles on the roads in the mine include small personal vehicles, such as pick-ups and sport utility vehicles, all the way to 400 ton capacity Caterpillar 797 haul trucks with over 12 foot diameter tires. The equipment interaction presents many opportunities for collisions and obstructions. To assist in tracking the various vehicles and avoiding problems, the position of each vehicle is determined from signals transmitted from the land-based transmitters or other systems, such GPS, GLONASS, Loran, inertial measurement units or any combination of the above.

A mine may have a single dispatch location, which visually monitors the activity within the pit of the mine. If needed, the dispatch personnel may engage an "All Stop" signal via CB radio to all of the heavy equipment in the mine. In addition, mines have experimented with radar/beacon systems (on the haul trucks), TCAS-like Traffic Collision Avoidance Systems (SafeMine), and others, as well as with autonomous vehicles, or remotely operated vehicles. In case of autonomous or remotely operated vehicles, manual oversight and override functions are maintained for safety purposes. A manual restart is enabled if a safety stop has been triggered by any of the numerous safety systems on board, such as vision systems, proximity radar and others. This requires a visual inspection of the machine from all angles to assure no personnel nor equipment are in the path of the vehicle.

For autonomous vehicles, developers have incorporated on-board cameras, which visually observe areas in front and at the sides of the vehicles. The onboard systems are typically focused on the areas around the vehicle, and not the vehicle itself. A camera system mounted on or near a dispatch center may provide a non-vehicle point of view of the situation. The dispatch-mounted cameras are steered manually or are permanently aligned with a road intersection, providing only a single vantage point. A camera at the dispatch center may not have line-of-sight with a particular vehicle due to obstructions, such as due to a non-circular mine arrangement.

BRIEF SUMMARY

The present invention is defined by the following claims, and nothing in this section should be taken as a limitation on those claims. By way of introduction, the preferred embodiments described below include methods and systems for visual tracking of vehicles, such as vehicles in an open-pit mine. The location of a vehicle is determined using radio frequency signals, such as pseudolite transmissions of ranging signals. The camera is steered based on the target's location. For example, multiple cameras are focused automatically on a vehicle based on the vehicle position. Images from a plurality of perspectives are provided to resolve or prevent a problem. The steering may include zooming for better viewing of vehicles at different distances from the camera. The steering may be incorporated into a vehicle management system, such as a dispatch system. For example, a user selects a vehicle from a list of managed vehicles or a displayed map, and the cameras are steered to view the selected vehicle based on the position of the vehicle. Any one or more features discussed herein may be used alone or in combination.

In a first aspect, a system is provided for imaging of vehicles in an open-pit mine. A plurality of land-based transmitters is at different known locations in or by the open-pit mine. A plurality of cameras each steerable along at least two axes is positioned at or by respective land-based transmitters such that updates for the known locations of the land-based transmitters correspond to camera locations. The cameras are operable to zoom. A management processor is operable to determine locations of a plurality of vehicles in or by the open-pit mine as a function of signals transmitted from the land-based transmitters at the known locations and received at the vehicles. A display is operable to display a graphical representation of the locations of the vehicles. The management processor is operable to steer the plurality of cameras to a first one of the vehicles and to zoom the plurality of cameras as a function of distances from the cameras to the first one of the vehicles. The display is operable to display images from the plurality of cameras. The images show the first one of the vehicles from different angles such that four sides of the first one of the vehicles are shown in the images.

In a second aspect, a system for imaging with a camera is provided. A camera is steerable along at least a first axis. A user input is operable to receive a user indication of selection of at least a first one of a plurality of mobile vehicles. A display is operable to display a representation for at least the first one of the mobile vehicles on a map. The first one of the mobile vehicles has a radio frequency determined position. A processor is operable to steer the camera to view the first one of the mobile vehicles in response to the user indication. The camera is steered as a function of the radio frequency determined position of the first one of the mobile vehicles.

In a third aspect, a method for imaging with a camera is provided. Locations of a plurality of managed vehicles are determined with radio frequency ranging. A graphical representation of the locations and types of the plurality of managed vehicles is displayed. A plurality of cameras is focused automatically on a first one of the plurality of managed vehicles as a function of the location of the first one of the managed vehicles. Images from the cameras of the first one of the managed vehicles are displayed.

In a fourth aspect, a system is provided for imaging with a camera. A plurality of land-based transmitters is at different known locations. Each of the land-based transmitters is on a respective mast. A plurality of steerable cameras is positioned on the masts. A processor is operable to determine a location of a vehicle as a function of signals transmitted from the land-based transmitters to the vehicle and operable to steer the cameras to view a vehicle as a function of the location.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND THE PRESENTLY PREFERRED EMBODIMENTS

Any or all available cameras automatically and generally instantaneously steer to and/or focus on a vehicle of interest equipped with a positioning system antenna. The vehicle may be subjected to a potential hazard condition on a haul road, be a stalled autonomous vehicle, be a stolen vehicle, be an emergency response vehicle, be a managed vehicle, or be another vehicle with a trackable or known position. The system allows one or multiple cameras, each in a known position, to automatically and in real time steer, focus, zoom, and/or track a vehicle or object equipped with a positioning system antenna, providing as many live views as the number of cameras being used.

A user interface and a control system allow coupling of the system to a graphical dispatch system. At a touch of a screen on a designated (graphically) target vehicle (or object), the vehicle is targeted by the cameras. The cameras may have different modes of operation, such as continuous road scanning, vehicle hopping, proximity activated triggers, or locking onto a given vehicle.

The known position of a receiver antenna embedded on the target vehicle or object of choice is used. The position is determined using satellite signals, such as GPS positioning, and/or using land-based transmitters, such as disclosed in U.S. Pat. No. 7,339,525, the disclosure of which is incorporated herein by reference. Steering one or more cameras using radio frequency determined position may be utilized in mines, at airports (e.g., tracking taxing planes on the ground, short approach or in pattern below radar coverage, at remote airports with radar feed from a distant radar installation), in cities, for law enforcement (e.g., helicopter or traffic camera tracking a stolen vehicle or other police assets, or a vehicle used in a high speed chase), for people (e.g., tracking cell phone position (or other electronic equipment, like PDAs, laptops, etc.) and steering a camera accordingly), or in other environments.

Various embodiments are discussed herein. An open-pit mine environment is used to describe the operation in general, but the systems and methods may be used for other purposes or in other environments. For example, the system operates using GPS positioning without land-based transmitters. Cameras may be provided as part of the positioning system or for other reasons, such as traffic and/or security cameras in an urban setting.

Figure 1:
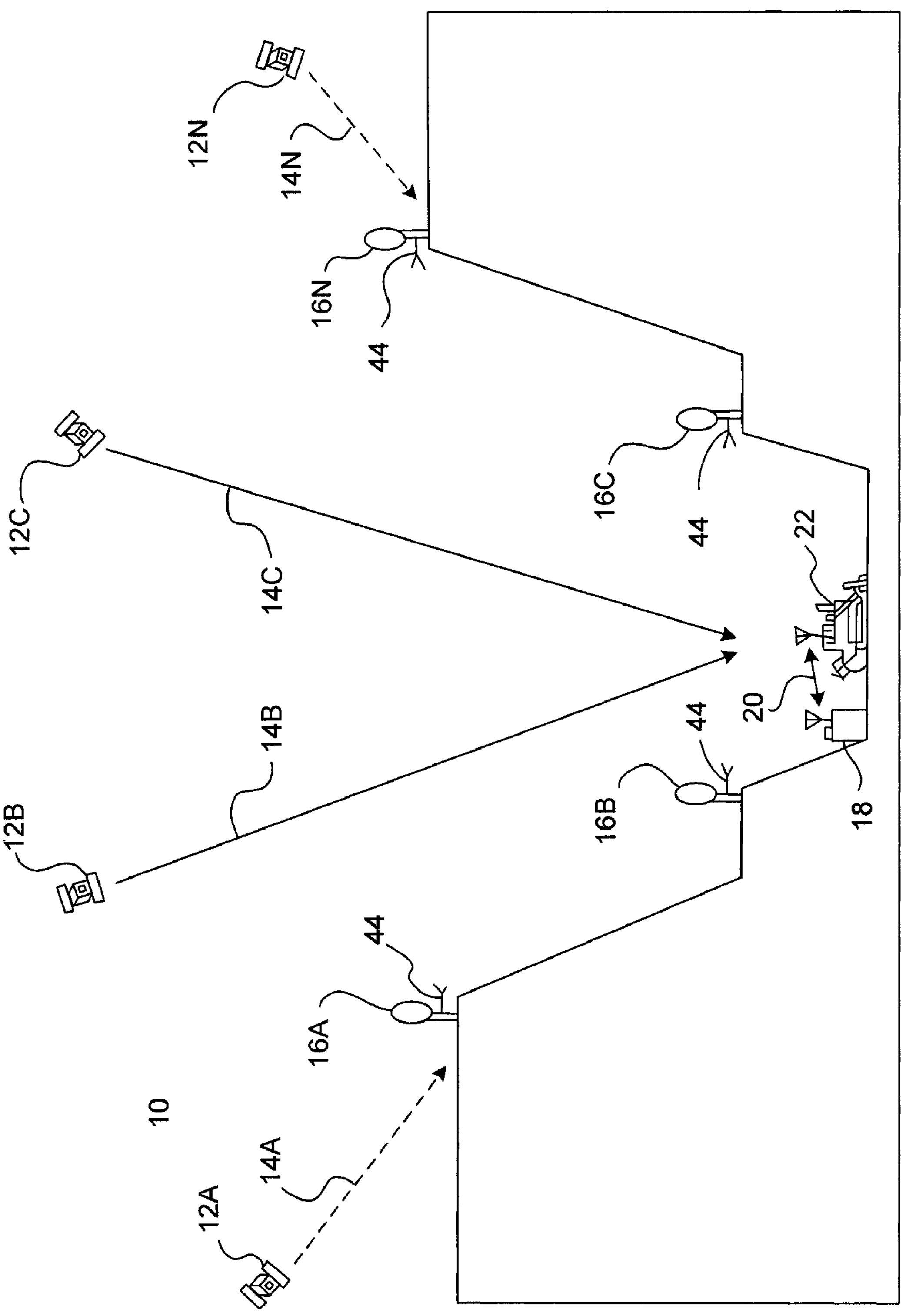
FIG. 1 is a graphical representation of one embodiment of a visual tracking and local positioning system in an open pit mine.

The open-pit mine environment may use only GNSS signals, only land-based transmitters, inertial, or any combination of the above. GNSS relies on access to a plurality of satellites at any given location on the globe. (For example, access to at least five satellites allows for position solution with carrier phase based centimeter accuracy. Some locations lack sufficient access to satellites. For example, FIG. 1 shows a system 10 with a plurality of satellites 12A-N relative to an open pit mine. A reference station 18 and mobile receiver 22 have lines of sight 14B, 14C to two satellites 12B, 12C but the walls of the mine block access to signals from other satellites 12A, 12N. In order to provide accurate positioning, a plurality of land-based transmitters 16A-N are positioned within the mine, encircling the mine, around the mine, or a combination thereof.)

The land-based transmitters 16, reference station 18, and/or mobile receiver 22 are a local positioning system, such as one or more of the embodiments described in U.S. Pat. No. 7,339,525. The local positioning system is operable without the satellites 12, but may be augmented with the satellites 12. Additional, different or fewer components may be provided, such as providing a greater or less number of land-based transmitters 16. As another example, the local positioning system may use a mobile receiver 22 without a reference station 18. A receiver may use signals from the local positioning system to determine a position or range. For example, the range from any one or more of the land-based transmitters 16 to the reference station or the mobile receiver 22 is determined. A position may be determined from a plurality of ranges to other land-based transmitters 16.

The land-based transmitters 16 are positioned at any of various locations within or around the mine. The land-based transmitters 16 include transmitters on poles, towers, directly on the ground, on stands, or other locations where the transmitter is maintained in a substantially same position relative to the ground. For example, the land-based transmitters 16 are mounted on masts that may be raised for use and lowered for maintenance. The land-based transmitters 16 are positioned such that most or all locations in the mine have line-of-sight access to four or more land-based transmitters 16. Access to a fewer number of transmitters may be provided.

The mobile receiver 22 is positioned on a piece of equipment, such as a truck, crane, excavator, vehicle, stand, wall, or other piece of equipment or structure. A plurality of mobile receivers 22 may be provided, such as associated with different vehicles and/or different parts of a vehicle. The reference station 18 is a land-based receiver, such as a receiver on a pole, tower, stand, directly on the ground, or other position maintained in a substantially same location relative to the ground. While the reference station 18 is shown separate from the land-based transmitter 16, the reference station may be located with one or more of the land-based transmitter 16. More than one reference station 18 may be used. Both of the reference station 18 and mobile receiver 22 are operable to receive transmitted ranging signals from at least one of the land-based transmitters 16.

As shown in FIG. 1, a differential solution technique may be used. The ranging signals from one or more of the land-based transmitters 16 or other transmitters are received by both the reference station 18 and the mobile receiver 22. By communicating information on link 20 from the reference station 18 to the mobile receiver 22, additional accuracy in determining a position may be provided. In alternative embodiments, non-differential solutions are provided.

The local positioning system may use GNSS, such as GPS, ranging signals for determining the position of the mobile receiver 22. Ranging signals include coding for determining a distance from a transmitter to a receiver based on the code. For example, the GNSS type-ranging signal is transmitted at the L1, L2, or L5 frequencies with a direct-sequence, spread spectrum code having a modulation rate of 10 MHz or less. A single cycle of the L1 frequency is about 20 centimeters in length, and a single chip of the spread spectrum code modulated on the carrier signal is about 300 meters in length. The code length is about 300 kilometers. The transmitters 16 continuously transmit the code division multiple access codes for reception by the receivers 18, 22. In the absence of movement by the mobile receiver 22, integer ambiguity of the carrier phase may be unresolved. As a result, code based accuracy less accurate than a meter is provided using GPS signals. Given movement of the mobile receiver 22, carrier phase ambiguity may be resolved to provide sub-meter or centimeter level accuracy.

In another embodiment, the radio frequency ranging signals and corresponding systems and methods disclosed in U.S. Pat. No. 7,339,525 are used. The carrier wave of the ranging signal is in the X or ISM-bands. The X-band is generally designated as 8,600 to 12,500 MHz, with a band from 9,500 to 10,000 MHz or other band designated for land mobile radiolocation, providing a 500 MHz or other bandwidth for a local transmitter. In one embodiment, the carrier frequency is about 9750 MHz, providing a 3-centimeter wavelength. The ISM-bands include industrial, scientific and medical bands at different frequency ranges, such as 902-928 MHz, 2400-2483.5 MHz and 5725-5850 MHz. Different frequency bands for the carrier wave may be used, such as any microwave frequencies, ultra wide band frequencies, GNSS frequencies, or other RF frequencies.

To provide sub-meter accuracy, ranging signals with a high modulation rate of code, such as 30 MHz or more, are transmitted. Code phase measurements may be used to obtain the accuracy without requiring relative motion or real time kinematic processing to resolve any carrier cycle ambiguity. The ISM band or X-band is used for the carrier of the code to provide sufficient bandwidth within available spectrums. The length of codes is at least about a longest length across the region of operation, yet less than an order of magnitude longer, such as about 15 kilometers in an open pit mine, but other lengths may be used. The spread spectrum codes from different land-based transmitters may be transmitted in time slots pursuant to a time division multiple access scheme for an increase in dynamic range. The dynamic range is a range of power over which a receiver can track a signal, to distinguish from "range" as in distance measurement. To avoid overlapping of code from different transmitters, each time slot includes or is separated by a blanking period. The blanking period is selected to allow the transmitted signal to traverse a region of operation without overlap with a signal transmitted in a subsequent time slot by a different transmitter. Other ranging signals and formats may be used.

The system 10 includes one or more cameras 44 for visual tracking. For example, FIG. 1 shows four cameras 44, one camera 44 for each land-based transmitter 16. The cameras 44 may be positioned separate from the land-based transmitters 16 in the open-pit mine, such as with the reference station 18, at a dispatch station, on communications towers, or free standing (e.g., alone).

Figure 2:
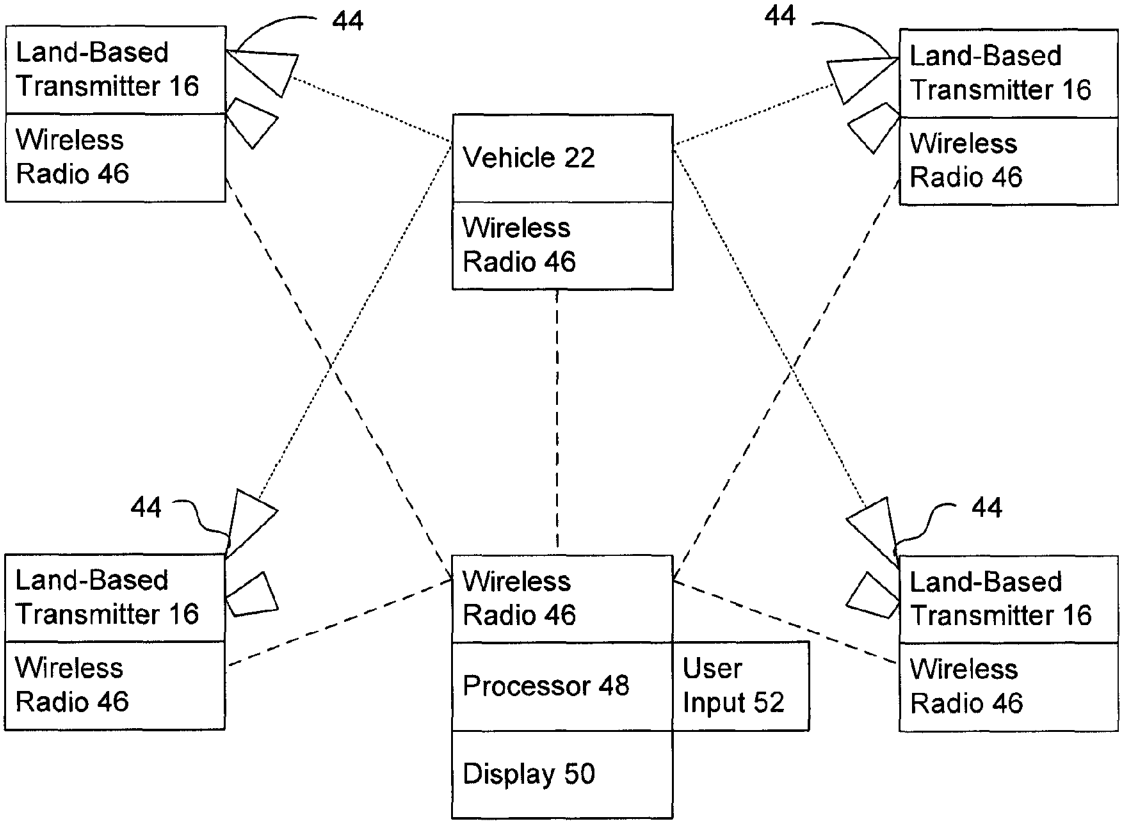
FIG. 2 is a block diagram of one embodiment of a visual tracking system.

FIG. 2 shows one embodiment of a block diagram of the system 10. Four land-based transmitters 16 are shown, but more or fewer may be provided. The land-based transmitters 16 are at different known locations, such as in or by the open-pit mine. For better line of sight, one, more, or all of the land-based transmitters 16 are mounted on a mast. The land-based transmitters 16 are part of a positioning system, such as used for tracking vehicle position in the mine and/or for autonomous vehicle operation.

The transmitters 16 are pseudolite, GNSS repeaters, or other radio frequency ranging signal transmitters. The transmitters 16 may modulate timing offset information received from a reference station 18 into the same communications signal as ranging information, but may alternatively generate ranging signals free of additional timing offset information. Each transmitter 16 of the system 10 has a same structure, but different structures may be provided. Each transmitter 16 generates ranging signals with the same or different code and/or type of coding. The transmitter 16 includes a reference oscillator, voltage controlled oscillators, a clock generator, a high rate digital code generator, mixers, filters, a timer and switch, an antenna, a microprocessor and a summer. Additional, different or fewer components may be provided, such as providing a transmitter 16 without TDMA transmission of codes using the timer and switch and/or without the microprocessor and summers for receiving phase measurements from the reference station 18. As another example, an oscillator, GPS receiver, microprocessor and digital-to-analog converter are provided for synchronizing the reference oscillator with a GPS system.

To determine the location of the mobile receiver 22 relative to a frame of reference other than the local positioning system, the location of each of the transmitters 16 is determined. In one embodiment, the location of each of the transmitters 16 is surveyed manually or using GNSS measurements. Laser-based, radio frequency, or other measurement techniques may be used for initially establishing locations of the various transmitters 16 and/or reference station 18. Alternatively, transmitted ranging signals received at two or more other known locations from a given transmit antenna are used to determine a position along one or more dimensions of a phase center of the given transmit antenna.

Figure 5:
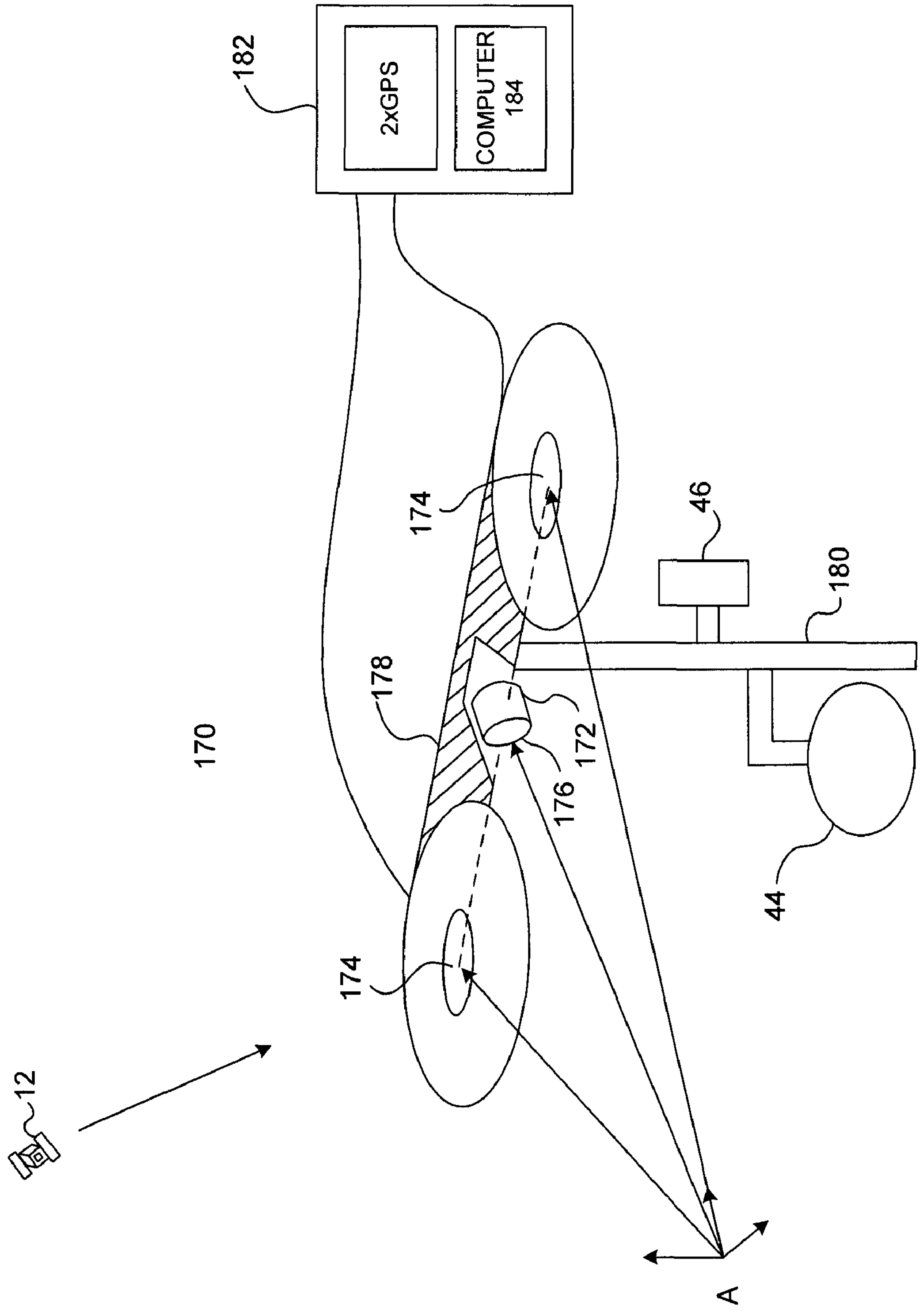
FIG. 5 is a graphical representation of one embodiment of land-based transmitter and camera.

In another embodiment, the electromagnetic phase center of a transmit antenna is measured with one or more sensors relative to a desired coordinate system or frame of reference. Knowing the electrical phase center allows for more accurate position determination. In one embodiment, a phase center is measured relative to a GNSS coordinate frame. FIG. 5 shows a system 170 for determining a position of a transmit antenna 172 using two receive GPS antennas 174. The accuracy of the position measurement is the same or better than a real-time kinematic, differential GPS solution (e.g. centimeter level). In one embodiment, the transmit antenna 172 is located between the two receive antennas 174, such that the transmit antenna phase center is substantially in the middle of the phase centers of the receive antennas 174. In this situation, the transmit antenna position can be determined by averaging position measurements from the two GPS antennas 174. In this embodiment, the spatial relationship of the transmit antenna 172 with respect to any one receive antenna 174 need not be known in advance.

In another embodiment, the spatial relationship of the transmit antenna 172 with respect to one or more receive antennas 174 is known. In this situation, the transmit antenna position can be determined from the known spatial relationship and the measured position of the one or more receive antennas 174. Any error in measurement of the phase center may not necessarily correspond to a one-to-one error in a position determination. Where differential measurement is used, any error in the phase center measurement may result in a lesser error for a position determination of the mobile receiver 22.

The system 170 for measuring a position of the transmitter location includes the receive sensors 174, a transmit antenna 172, a linkage 178, a mast 180, sensor electronics 182, and a computer 184. Additional, different or fewer components may be provided, such as providing additional receive sensors 174.

The transmit antenna 172 is a microwave antenna, such as an antenna operable to transmit X-band or ISM-band signals. The transmit antenna 172 has a phase center at 176. The transmit antenna 172 may be a helix, quad helix, patch, horn, microstrip, or other variety. The choice of the type of antenna may be based on beam pattern to cover a particular volume of the region of operation. The receiver antennas 174 may be suitable as transmit antennas.

The receive sensors 174 are GPS antennas, GNSS antennas, local positioning system antennas, infrared detectors, laser detectors, or other targets for receiving position information. For example, the receiver sensors 174 are corner reflectors for reflecting laser signals of a survey system. In the embodiment shown in FIG. 5, the receive sensors 174 are GPS antennas. While two GPS antennas are shown, three or more GPS antennas may be provided in alternative embodiments. The sensor electronics 182 connect with each of the sensors 174. For example, the sensor electronics 182 are a receiver operable to determine a position or range with one or more GPS antennas. Real time kinematic processing is used to resolve any carrier phase ambiguity for centimeter level resolution of position information. The sensor may be another local position system receiver.

The linkage 178 is a metal, plastic, wood, fiberglass, combinations thereof or other material for connecting the receive sensors 174 in a position relative to each other and the transmit antenna 172. The transmit antenna 172 is connected with the linkage 178 at a position where a line extending from the two receive sensors 174 extends through the phase center 176 of the transmit antenna 172. In one embodiment, the transmit antenna 172 is connected at a center of the line extending from the phase centers of the receive sensors 174, but any location along the line may alternatively be used. In one embodiment, the transmit antenna 172 and associated phase center 176 are adjustably connected to slide along the line between the phase centers of the two receive sensors 174. A set or fixed connection may alternatively be used. In another embodiment, the transmit antenna 172 is connected on a pivot to the linkage 178 to allow rotation of the transmit antenna 172 while maintaining the phase center 176 at or through the line between the two receive sensors 174. An optional sensor, such as inclinometer, optical encoder, rate sensor, potentiometer, or other sensor, may be used to measure the rotation of the transmit antenna 172 relative to the linkage 178.

The computer 184 is a processor, FPGA, digital signal processor, analog circuit, digital circuit, GNSS position processor, or other device for determining a position of the transmit antenna 172 and/or controlling operation of the transmit antenna 172. The position of the transmit antenna 172 is determined with reference to a coordinate frame A. The locations of each of the transmit and receive antennas 172, 174 are measured from the respective electromagnetic phase centers.

In one embodiment, the distance along the line from each of the receive antennas 174 to the transmit antenna 172 is not known, but the ratio of the distances is known, such as halfway between the receive antennas. The position of the transmit antenna 172 is calculated from the position determined for each of the receive sensors 174. The computer 184 measures signals received from the receive sensors 174 and calculates positions of both of the receive sensors 174. The computer 184 calculates the position of the transmit antenna 172 as an average or weighted average of the two receive antenna position measurements. Using a separate rotational sensor measurement, the directional orientation of the transmit antenna may also be determined. The relative attitude or orientation of the antennas need not be known to determine the location of the transmitter 172, but may be used to provide an indication of the orientation of the transmit antenna 172.

The system 170 is positioned at a desired location, such as on the ground, on a structure, on a building, or on the mast 180. The position of the receive sensors 174 is then calculated, such as by ranging signals from a plurality of satellites 12. The resulting location of the transmitter 172 is relative to the coordinate frame of reference based on the position of the transmitter 16 on the earth.

In an alternative embodiment, a plurality of GNSS antennas, such as three or more, is used to measure a position and orientation of the linkage 178. The position and orientation of the transmit antenna 172 with respect to the 3 or more GNSS antennas is known. By measuring the positions of the three or more GNSS antennas in coordinate frame A and knowing the position and orientation of the transmit antenna 172 with respect to the three or more GNSS antennas fixed to linkage 178, the position of transmit antenna 172 is determined relative to the frame of reference A using standard geometric principles. In yet another alternative embodiment, the position of the transmit antenna in the frame of reference A may be determined using any other sensor for measuring the orientation and/or position offset with respect to one or more GNSS antennas.

As shown in FIGS. 2 and 5, cameras 44 are provided with at least some of the land-based transmitters 16. Each camera 44 is an optical, thermal, infrared, night vision, or combinations thereof. The camera 44 is a black and white camera or may be a color camera. In one embodiment, the camera 44 is a CCD or other semiconductor based camera. In one embodiment, a Sony SNC-RZ50N camera, or similar, with a protective external housing is used. The same or different type of camera 44 may be used for different locations.

The camera 44 is steerable along at least one axis. For example, the camera 44 includes one or more servos or other motors for rotating the camera 44 along one or more axes. By providing horizontal and vertical rotation, the camera 44 may be directed towards any location in a range of 3D space.

The camera 44 may be focused automatically. Given a known distance, the camera 44 may be focused to optimize the view at that distance. The focus is electronic and/or optical (e.g., using a lens). Circuitry or servos focus the camera 44 at the desired distance. In alternative embodiments, the focus is fixed.

The camera 44 may zoom. Electronic or optical (e.g., lens based) zoom may be used. A servo or circuitry causes the camera 44 to be restricted to a desired size at a desired distance. Zooming and/or focusing at a particular distance may allow a user to make remote decisions about the nature of an obstacle or safety condition surrounding the vehicle in question. The camera 44 is zoomed and/or focused to the area of interest, allowing more detailed viewing of the situation.

The cameras 44 are positioned at or by respective land-based transmitters 16. For example, one or more of the cameras 44 connect to each of the masts 180 of the land-based transmitters 16. The cameras 44 are positioned on the masts 180, such as shown in FIGS. 1 and 5. For example, the cameras 44 connect to the masts on gimbals. The cameras 44 may be built into the frame 178, below the transmit antenna 172, above the transmit antenna 172, or located on a separate support structure. In one embodiment, some or all of the transmitters 16 include co-located 2-axis cameras equipped with a large optical zoom functionality (e.g., between 5-10 yards and 15 kilometers). The cameras 44 may be mounted at a known distance relative to a known or measurable location, such as about 2 feet below the transmit antenna 172. The camera 44 is co-located in the vertical axis with the transmit antenna 172, giving a known survey location of the camera 44 to the nearest inch, after accounting for the vertical installation offset, as well as the heading of the camera 44, since the heading of the transmit antenna 172 is surveyed or measured.

In another embodiment, one or more of the cameras 44 are deployed in a stand-alone arrangement, such as on a camera mast connected to a trailer. The location of the camera 44 is surveyed or a GNSS antenna and receiver are provided to measure the location of the stand-alone camera 44. In another alternative, one or more of the cameras 44 are mounted on mobile vehicles 22, but may be steered, focused, and/or zoomed to view other vehicles 22 or locations given the known position of the camera.

The initial position determination of the transmit antenna 172 updates the location of the land-based transmitter 16. Since the camera locations correspond to that same location, updates to the location of the transmitters 16 correspond to updates of the camera locations. Further updates may be performed, such as periodic or triggered surveying or measurement of the location to verify the transmitter and/or camera position has not changed. People, vehicles, strong winds, material failures, or ground movement may result in repositioning of the transmitter 16 and camera 44.

The heading of the camera 44 is calibrated. An optional sensor, such as inclinometer, optical encoder, rate sensor, potentiometer, encoder, or other sensor may be used to measure the heading of the camera 44 given an initial heading or known heading. For example, the cameras 44 are installed pointing north or other given direction. As another example, the cameras 44 are installed pointing in a same direction as the respective transmit antennas 172. As the headings of the transmit antennas 172 are determined, then the heading of the cameras 44 are determined. The angle or difference in heading of the cameras 44 and transmit antennas 172 may be measured rather than starting with a same heading for calibration.

In alternative embodiments, a compass is measured to indicate the heading of the camera 44. A plurality of GNSS antennas connected with the camera may be used to determine the heading. In another alternative, the cameras 44 are manually pointed (steering) and centered on a surveyed or known location, such as a reference station antenna. Given the known location of the camera 44, the heading is determined based on the known location of the object being viewed. If plumbness (i.e., vertical orientation) is not guaranteed, then the camera may be manually pointed (steered) at another transmitter 16 to calibrate the remaining unconstrained axis (or any other know or pre-surveyed point). Alternatively, the offset from vertical between the camera 44 and the transmit antennas 172 may be measured by an inclinometer aligned to the mast 180.

The camera 44 is powered by solar cells, batteries and/or power from electrical grid. In one embodiment, the transmitter 16, the wireless radio 46, and the camera 44 are powered by the same solar cell and battery source. If heat needs to be provided to the external housing in arctic (or low temperature environments) or for other reasons, AC power or a diesel generator may be provided with or without batteries. Separate power sources may be provided for the transmitter 16, wireless radio 46, and camera 44.

In one example embodiment, a trailer (e.g., shipping container) with a 27' or other height mast, battery bank, and solar panels (or diesel Generator set) is used to provide both a power source as well as easily transportable support for the transmitters 16 and cameras 44. The trailer-mounted mast has a manual hoist, which allows for easy maintenance access at ground level.

The land-based transmitters 16 and cameras 44 are distributed around or within the open pit mine such that at least four cameras 44 and land-based transmitters 16 have line of site to all possible locations for the vehicles 22. Fewer cameras 44 and/or transmitters 16 may have line of sight to a given location in the open pit mine. The transmitter locations are selected to have maximum visibility of the mine, with the design objective being that every point in the mine has a line of sight to a minimum of four transmitters 16. This arrangement assures continuous positioning. The same maximum mine visibility goal applies to a vision monitoring system. Placing cameras at the transmitter locations allows every point in the mine to be viewed by a minimum of four cameras, most likely distributed at different directions around the location. In other environments, such as within a city, fewer or greater number of cameras 44 and/or transmitters 16 may have line of sight to any given location.

The vehicle 22 is a car, pick-up truck, sport utility vehicle, hauler, crane, shovel, lift, mining truck, or other now known or later developed vehicle. The vehicle 22 is mobile or stationary. The vehicle 22 includes one or more receiving antennas and a receiver. By receiving ranging signals or other radio frequency information, the receiver may determine the position of the vehicle 22. For example, GNSS and/or land-based transmitter ranging signals are received from a plurality of sources. Using carrier and/or code phase information, the position of the vehicle 22 is determined. Other radio frequency signals or other methods, such as Inertial Measurement Units, may be used to determine position. For example, radio communications, such as associated with cellular communications, are used to determine the position.

The vehicle 22 is an individual vehicle or is a fleet vehicle. Fleet vehicles 22 are part of a collection of vehicles to perform service for a company. For example, a mining company owns a plurality of fleet vehicles for mining. As another example, the government has a fleet of vehicles for safety (e.g., police cars, fire trucks, and/or ambulances), for services (e.g., commuter buses), or for maintenance (e.g., snow plows).

The fleet vehicles 22 have wireless communications with a dispatch or management system. Managed vehicles may be tracked, but not necessarily dispatched. A dispatched vehicle is sent on specific purpose trips by the dispatch system. For example, an open-pit mine may include a dispatch system for dispatching haul trucks and heavy equipment to maximize mining output. A managed pick-up truck may be used to check on various equipment for routine maintenance, but without being dispatched by the dispatch system. The wireless communications allows vehicles to be dispatched with an assigned task, such as instructed to perform certain actions or go to certain locations. A managed vehicle may be dispatched.

The vehicle 22 is controlled by an operator, such as a driver. In other embodiments, the vehicle 22 operates autonomously or semi-autonomously. For example, the vehicle 22 drives from one location to another without a human operator steering and/or controlling speed and braking. Position tracking, radar, and/or other sensors are used to control the vehicle. An operator may be in the autonomous vehicle for manual override. The operator is provided with an in-vehicle display and vehicle user input. The display allows the operator to view an image, such as from a vehicle-mounted camera or from one of the cameras 44. The user input allows for manual override of the autonomous control system and/or requests of views of the vehicle or an obstruction.

A processor 48, display 50, and user input 52 are provided as a dispatch system, management system, or control system. The processor 48, display 50, and user input 52 allow coordination and/or control of the cameras 44 and position determination system. While shown in FIG. 2 as a centralized system, distributed processors 48, displays 50, and user inputs 52, such as different personal computers, may be used to allow control, management, coordination, and/or dispatch from a plurality of different locations. In alternative embodiments, processors are built into each of the cameras. Each of the cameras within the system is given a target location, and processing for steering occurs on board the camera.

The user input 52 is a mouse, keyboard, trackball, touch pad, joystick, slider, button, key, knob, touch screen, combinations thereof, or other now known or later developed user input device. The user input 52 receives a user indication of selection of at least a first one of a plurality of mobile vehicles. For example, the user enters an identification of a vehicle and/or selects the vehicle from a list of vehicles. As another example, the user selects an icon or representation of a vehicle from a map or dispatch display.

The display 50 is a CRT, LCD, monitor, plasma screen, projector, printer, or other display device. More than one display may be provided, such as having one screen for a dispatch system and another screen to display camera views.

Figure 3:
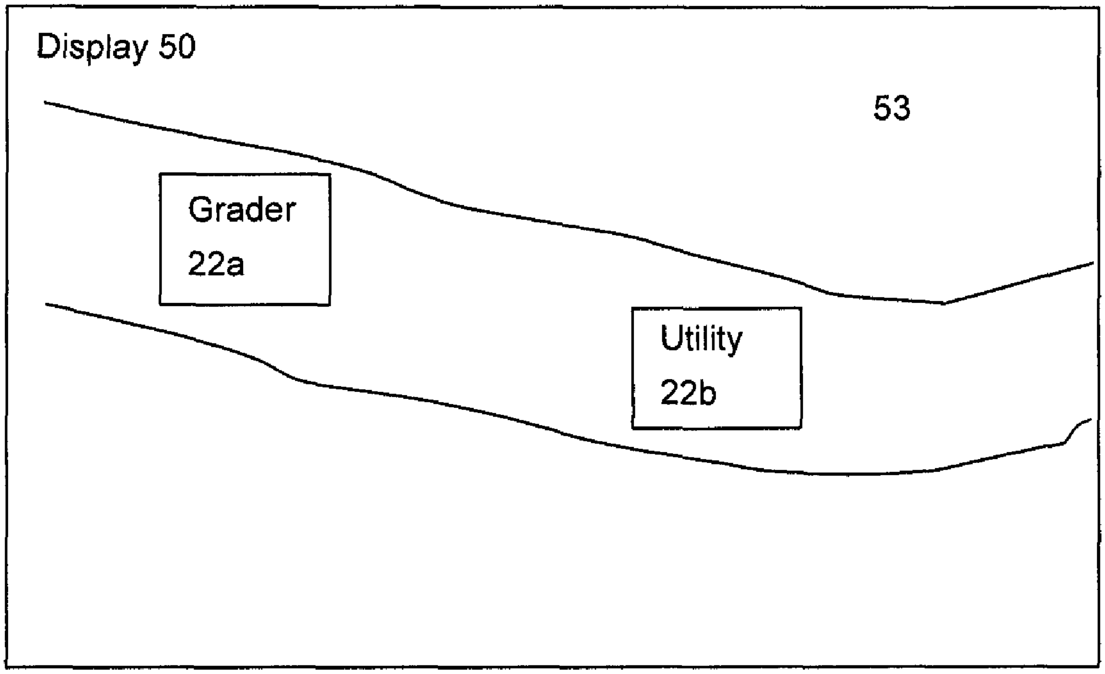
FIG. 3 is graphical representation of a map in one embodiment.

FIG. 3 shows one image 53 of a management or dispatch system. The image 53 is a map. The map shows a local region, such as terrain and/or man-made structures (e.g., roads and buildings). Other images with or without a map may be used, such as a display of relative positions but without terrain and/or road features. The image 53 includes graphical representation of the locations of the vehicles 22. For example, an icon is displayed for each vehicle 22. The color, size, shape, and/or text for the icon indicate the type of vehicle and/or identity of the vehicle.

In a dispatch system example, the image 53 graphically displays the position of each monitored, position equipped small or large vehicle on the map of the mine site. The image may resemble something of an Air Traffic Controller's display—target points with "flags" moving on a screen in line with continually updated individual positions. The flags contain vehicle type and number, and perhaps scheduled destination. With a touch-screen display, touching on the flag expands the flag to include additional information, such as velocity, load, origin, destination, truck operating parameters (tire pressure, engine temperature, etc.), or any other data deemed relevant.

Figure 4:
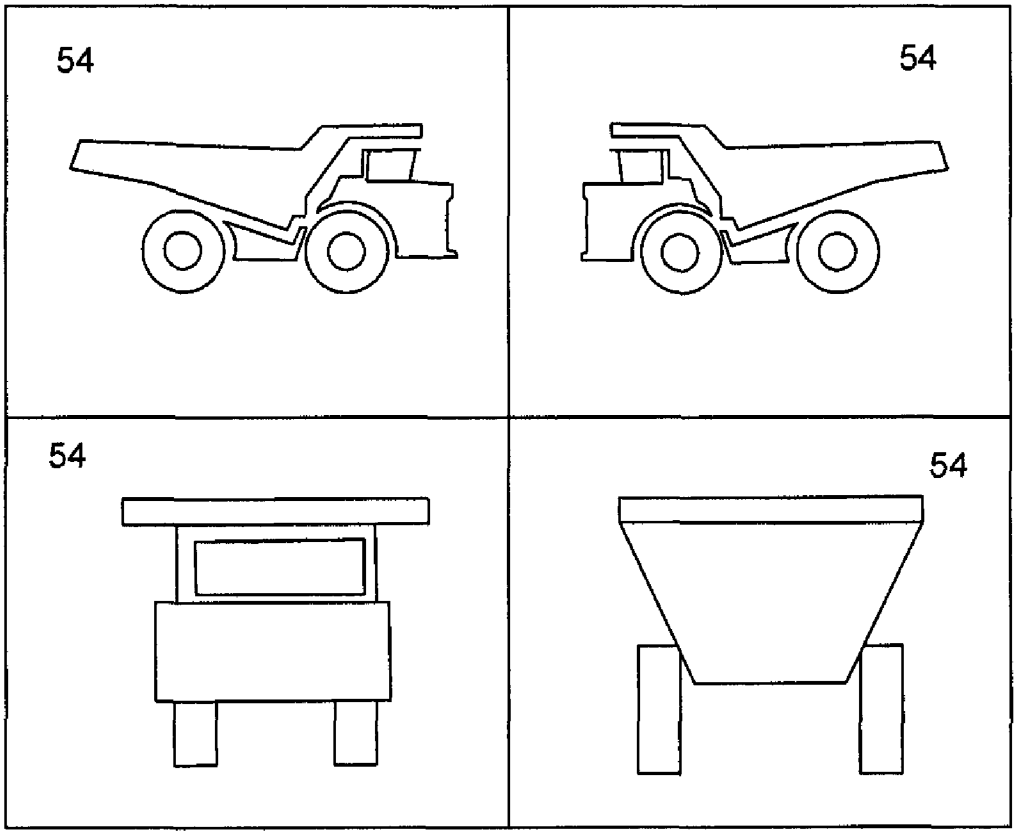
FIG. 4 is a graphical representation of four images of a vehicle according to one embodiment.

The display 50 alternatively or additionally shows images from the cameras 44. FIG. 4 shows an example of a haul truck viewed from four different angles by four different cameras 44. In this example, all four sides of the vehicle 22 are shown. In other example, one or more of the views 54 may be at other than orthogonal to a side of the vehicle. A view 54 from above the vehicle may also be provided, such as a view 54 from a camera 44 on an edge of a mine. More or fewer images may be used. The amount of zoom may be greater or less, such as having less zoom to more likely show an obstruction. The center of the image may be at the center of the vehicle or offset, such as offsetting side views to show more region in front or behind of a vehicle, more likely imaging any obstruction. Different images from different cameras of a same side of the vehicle may be generated with each image having different zoom level and/or offset.

In an alternative embodiment, the camera views 54 or images are displayed along a perimeter of or adjacent to the image 53 on a same display 50. An image may be provided for each available camera 44 or for only a sub-set of the cameras 44.

The cameras 44 are automatically or manually controlled. For example, the user selects a view 54. The selection of the view 54 activates manual control of the selected camera 44. Using a joystick or other input, the user steers the selected camera 44 as desired. One view 54 may be emphasized, such as allowing the user to select (e.g., double tap) a view 54 to be enlarged relative to or replace other views and/or the map.

Referring again to FIG. 2, the processor 48 is general processor, digital signal processor, application specific integrated circuit, field programmable gate array, digital circuit, analogy circuit, combinations thereof, or other now known or later developed device for coordinating location with camera imaging. In one embodiment, the processor 48 is part of a personal or laptop computer or workstation. In other embodiments, the processor 48 is part of a management or dispatch system. For example, the processor 48, display 50, and user input 52 are part of a graphical dispatch system running dispatch software (e.g., as available from Caterpillar, Modular Mining Systems, Inc. or Leica). In alternative embodiments, the processor 48 is part of a positioning system without dispatch control. The processor 48 may use a list of subscribing receivers (e.g., IP addresses for each receiver) used by the position determining system. The relative XY positions are displayed as an overlay on the mine map.

The processor 48 determines a location of the vehicle 22 as a function of signals transmitted from the land-based transmitters 16 to the vehicle 22. The signals are radio frequency ranging signals or other radio frequency signals (e.g., radio cellular communications). The determination may be performed by receipt of position information from other sources. For example, the vehicle receives the signals and determines a position. The wireless radio 46 for the vehicle 22 transmits the determined position to the wireless radio 46 for the processor 48. Alternatively, the processor 48 determines the position from ranging measurements performed at the vehicle 22. The locations of a plurality of vehicles 22 in or by the open-pit mine are determined.

The processor 48 determines distances and angles of the vehicle location relative to one or more cameras 44. Using the known positions in three-dimensional space, the heading and elevation of the camera 44 and the distance between the camera 44 and the vehicle 22 is determined. The distance and angle are determined for one or more cameras 44 relative to a given vehicle. The processor 48 may control the cameras 44 to steer to an angle for viewing the vehicle, and focus and zoom based on the distance. The cameras 44 are controlled to view a vehicle 22 as a function of the location of the vehicle 22.

The processor 48 controls the cameras 44. If a camera 44 is being manually controlled with the user input 52, the processor 48 converts the user input into steering, focusing, and/or zooming commands to the camera 44. The location of the vehicle 22 is the phase center of the antenna on the vehicle 22 being tracked. The processor 48 may used a database indication of the location of the antenna relative to the vehicle 22. The aiming of the cameras 44 accounts for this relative antenna location and the size of the vehicle to determine a zoom level. Alternatively, the antenna is assumed to be at the center of the vehicle.

In manual mode, each of the cameras 44 may zoom completely out to see as much of the pit as possible. Other predetermined steering settings or zoom levels may be used. In this mode, the dispatcher monitors each of the views to see if something catches his/her attention, or until a trigger event occurs.

Software may control operation of the processor 48 for controlling the camera 44 without user input. Different modes of operation of the cameras 44 may be provided. For example, a road scan mode is used. The management processor 48 steers the plurality of cameras 44 to scan along one or more roads in the road scan mode. Since haul roads and shovel loading areas are pre-defined and surveyed, the cameras 44 scan and zoom along the haul roads and loading areas in a continuous loop. The cameras 44 are fixed on the desired location (e.g., loading area) or move back-and-forth along a road. The displayed views may cycle through different cameras sequentially and/or multiple images are shown at a same time. Different views of the mine may be displayed at a same time or in sequence.

A vehicle-hopping mode may be used. The processor 48 causes the images to substantially continuously switch between views of different ones of the vehicles. The cameras 44 are controlled to track different vehicles 22. The cameras hop from one vehicle to another for a pre-determined (e.g. 2-3 seconds) duration. When the camera 44 is steered and zoomed to the desired vehicle 22, the view of the vehicle is shown. Different cameras 44 may show different vehicles, and/or a plurality of cameras 44 may show a same vehicle at a given time and hop to view a different vehicle at a different time. Different views of the mine may be displayed at a same time or in sequence.

A segment mode may be provided. Each camera 44 zooms partially (e.g., medium level of zoom) to view a portion of a mine. For example, one camera 44 focuses on the bottom of the pit, another camera 44 focuses on the haul road, and a third camera 44 focuses on a haul road intersection.

A follow mode may be provided. Each camera 44 is assigned an asset or vehicle 22 to track. For example, in smaller operations, each vehicle 22 that enters the pit is tracked by one camera 22, or is "handed off" to another camera 22 when applicable. Alternatively, each camera 22 is zoomed in on a high value asset, for example the loading area immediately surrounding a shovel. The dispatcher or user can monitor each of the shovels and react if the queue is empty, or if debris is present in the truck loading area, necessitating a call for a front loader to clean up the area. This may allow dispatch only as needed, reducing tire wear.

A trigger mode may be provided. The management processor 48 steers a plurality of cameras 44 to a particular vehicle 22 (or multitude of vehicles, if for example two vehicles are on a collision course) and zooms the cameras 44 to view the vehicle. The mode is triggered in response to a safety stop, detection of an obstruction (e.g., spillage from a previous truck or another vehicle), detection of an animal in path of travel, an abnormal measurement (e.g., low tire pressure), unexpected ceasing of movement, unusual speed (e.g., too fast or too slow at a given location), unusual location (e.g., deviating from a center of the road-lane), proximity to an obstruction, proximity to another vehicle, proximity to a feature of the open pit mine, proximity to a road condition, combinations thereof, or other event. The proximity may be determined by radar, ultrasound, position determination (e.g., two vehicles within a particular range of each other), or other autonomous sensing. Autonomous control of the vehicle may output a warning or safety stop to avoid possible collision. Alternatively, the vehicle operator issues a warning or takes a detected action. A haul truck that stops on a haul road for an unspecified reason may be detected. The dispatch software monitors the truck velocity against a pre-programmed profile for a particular section of the haul road. In response to unusual velocity, camera viewing is triggered.

Multiple cameras 44 view the vehicle 22 to assist in complete understanding and diagnosis of a problem. The management processor 48 steers and zooms the plurality of cameras 44 to a vehicle 22 in response to automatic detection. This may allow for more rapid response, response before a reduction in efficiency, and/or response that is more appropriate (e.g., sending a grader instead of a different vehicle to remove an obstruction). By viewing a vehicle 22 from different directions, more information is available. The dispatcher or other user remote from the vehicle 22 may override the safety stop or have the vehicle 22 take evasive action to continue operation. The management processor 48 receives an indication of a manual override of the safety stop and outputs the indication to the vehicle 22. By incorporating the camera system, the responsible operator (e.g., a dispatcher or a vehicle operator) may have a full 360-degree view of the vehicle 22 in question, and thus be able to safely maneuver the vehicle 22 around the detected hazard.

In one embodiment, the trigger mode is activated in response to a detected deviation in operating parameters. Other operating parameters than described above may be used. For example, thresholds for tire pressure, engine temperature, speed, or other aspects associated with vehicle maintenance are exceeded. Problems may be visually diagnosed and solved before a vehicle breaks down, minimizing down time.

An uplink or on demand mode may be provided. A vehicle operator may request a view or views of the vehicle 22, which they or another operate. In response to the request, the processor 48 causes one or more cameras 44 to steer to, zoom on, and/or focus on the vehicle 22. The resulting image or images are sent to the vehicle 22 for display to the vehicle operator. For example, an electric drill operator wants to check the position of the power cable behind the drill when repositioning for a new row of blast holes. The images are displayed in the cab so that the operator may make sure the cable is not going to be damaged when repositioning. As another example, a haul truck operator may want to check for debris in the area behind the truck prior to backing up for loading at a shovel. One or more images may show that the area is sufficiently clear to back-up. Since the driver does not have to exit the vehicle 22 for a visual inspection, the driver may be safer. The operation may also be more efficient.

In a hound or lock mode, a plurality of cameras are steered and zoomed to view the selected vehicle 22. The lock mode is separate from or part of the trigger mode. Unlike the trigger mode, the lock mode may be activated in response to user input rather than an automatically detected triggering event. All or a sub-set of the cameras 44 zoom and track a selected vehicle 22. The cameras 44 used for a given vehicle 22 may be selected to provide a diversity of views (e.g., all four sides) with a minimum or sub-set of cameras 44. As the vehicle 22 moves, the cameras 44 are steered, focused, and/or zoomed to track the vehicle 22. The location of the vehicle 22 relative to the location of the camera 22 is updated using the positioning system. The cameras 44 steer, zoom, and focus on the moving vehicle 22 using the updated position information. Other modes may be provided.

A moving target may be handed off between cameras 44. As the object moves into a new section or area, additional cameras 44 come on line as the object enters the field of view. Correspondingly, once the object leaves the field of view of a camera 44, the camera goes back to the previously assigned tracking method, or to control of a different dispatcher.

In addition to updating the location of vehicles 22, the cameras 44 may be controlled as function of updated positions of the cameras 44. The cameras 44 are monitored to determine the current position of the camera 44. For example, the position of the transmitter 16 is monitored. Any change in position of the transmitter 16 is extrapolated to the position of the camera 44. As another example, the camera 44 is on a mobile device, such as a balloon or helicopter. As the position of the mobile device (e.g., vehicle) changes, the position of the camera 44 used for steering, focusing, and zooming changes. In one embodiment, the updated position determination uses radio frequency ranging signals. Laser surveys, visual inspection, or other position determination may be used. The camera location is determined along three axes, but may be determined along a fewer number of axes. The heading of the camera 44 may be recalibrated or rely on previous calibration. A history of positions of the vehicle 22 may be used to extrapolate from a previously known heading of the camera 44 to a current heading.

In one embodiment, the position of the transmitters 16 and the respective cameras 44 or the position of cameras 44 with ranging signal antennas is determined from radio frequency ranging signals. For example, GNSS signals are received at the local positioning system transmitter 16. The positions of one or more receive antennas is determined. The receive antennas are connected with a transmitter support structure or camera 44. The position or location of the transmitter 16 relative to the receive antennas is determined as a function of the measured position of the receive antennas. The position of the receive antennas is determined from GNSS signals, but laser or other measurements and corresponding signals may be used to determine the position of the receive antennas. By providing a rigid support carrying the receive antennas and the transmitter 16 and/or camera 44, the position of the transmitter 16 and/or camera 44 is determined. The position of the transmitter 16 and/or camera 44 is then determined as a function of the position of the receive antennas. Local ranging signals may be used instead of or in addition to the GNSS ranging signals.

For dispatch operation, one or more cameras 44 may be steered, zoomed, and/or focused to view a vehicle 22 in response to user indication. For example, the dispatcher selects (e.g., touches an icon) a vehicle 22 displayed on a map or inputs the identification number associated with a vehicle 22. The management processor 48 steers, zooms, and focuses in response to the user selection. Selecting one of the icons relays the real-time position of the selected vehicle 22 to each of multiple cameras 44. Selecting a vehicle 22 automatically feeds the position of that vehicle 22 to an alignment algorithm run locally at each camera or centrally at a management processor. Each camera 44 knows its own position. By providing a second target point, bearing, elevation, and range are easily calculated. Target bearing and elevation is then fed to each of the cameras 44 (e.g., such as six or more cameras 44). The cameras 44 start repositioning. The range information is also fed to the cameras 44 in order to adjust the zoom and/or focus, such that the target fills the frame. Vehicle size may be a variable associated with each of the tracked vehicles 22. For an SUV, a larger zoom is made. For a haul truck, slightly smaller zoom is implemented due to the larger size.

With the target position information, each camera 44 pans, tilts, focuses, and/or zooms directly on the vehicle 22, providing close-up, real-time images from one or more points of view. Provided with such complete set of visual information, personnel in the dispatch center may judge if a critical condition exists and what course of action needs to be taken. Due to the speed of availability of the visual information, more efficient and rapid action may be taken.

The cameras 44 may be used to monitor facilities in addition to or alternatively to monitoring vehicles 22. For example, the processor 48 steers and zooms at least one of the cameras 44 to view one of the land-based transmitters 16, the reference station 18, fixed open-pit mine facilities (e.g., dispatch facility), communications infrastructure, or combinations thereof. The operation of the facilities, such as the position detection system, communications system, camera system, or other equipment, may be debugged or maintained with the assistance of views from one or more cameras 44. A camera 44 is used to visually inspect the infrastructure, such as a transmitter 16, for any physical damage or bird activity on top of the antennas. For example, the camera 44 allows inspection of the physical condition of an antenna installation on a shovel or on top of a drill mast without the need for shutting down the machine to allow personnel to board. A "non-working" receiver may be because a drill mast has been lowered or that an antenna has been torn off by contact. Visually determining the problem may allow for a remote fix or dispatch of properly equipped maintenance personnel.

Given sufficient cameras, different modes of operation may be implemented at a same time. For example, four cameras lock on to a vehicle, such as in response to a trigger or uplink request. Other cameras continue to view segments of the mine, scan locations, or operate in manual modes. Other modes may be provided, such as using the cameras to scan for security threats or theft along a fence or border. A sleep mode may be used, such as incorporating algorithms to determine if a driver is drowsy or asleep. The camera 44 with a best view of the driver is used to acquire the image of the driver for processing.

The communications occur over a wireless communications network of wireless radios 46. Any wireless radio may be used, such as IP radios using WiFi, MESH, or WiMAX radios. In one embodiment, a Motorola Canopy radio system is used to make a point-to-point, high bandwidth links. Alternatively, point-to-point connections may be made with the Reference Station 18, or other on-site office with communications to the processor 48 or other component via wired connections, such as copper or fiber optic Ethernet connectivity.

The network ties the cameras 44 to the dispatch system, a control system, vehicles 22, and/or the processor 48. The network has sufficient bandwidth to provide location information and real-time camera images. Due to bandwidth limitations, the camera images may be delayed or only provided periodically, such as every 5-10 seconds. Having a 5-second-old snapshot may be sufficient in most situations. In alternative embodiments, the camera images are transmitted on a network, wired and/or wireless, separate than the network used by the location system.

Other uses than an open-pit mine may be provided. The other uses include other environments using land-based transmitters or pseudolite systems. Other uses may include GNSS systems operating without land-based transmitters. For example, the camera system may be deployed without the cost and benefits of the land-based transmitter system. The customer would not utilize the full savings associated with co-positioning transmitters and cameras, but could provide the camera function based on position information. The individual cameras may be surveyed initially or periodically using a standard GPS receiver, or any other surveying method.

Another use for the local positioning and camera system is within a city ("Urban Canyon"). Centimeter level accuracy, such as comparable to the highest available accuracy from GPS, may be desired, but lesser accuracy is possible. A real-time update rate associated with 10 Hertz or higher may allow tracking of user speeds of 40 miles an hour or more. Higher speeds may be provided. Given the typical grid or various street layouts of cities, hundreds of transmitters may be used. Alternatively, fewer transmitters are used to cover less of a city. Any of various transmitter ranges may be used, such as line of sight down one or more streets for a kilometer or more. Transmitter powers may be associated with coverage of a limited a number of blocks, such as four or fewer blocks. Using a large dynamic range in power, such as corresponding to tracking ranges in distance from one meter to one kilometer, various locations and tracking operations within the city may be performed. For example, location based services are provided for cell phones or personal data assists.

Cameras associated with the transmitters or for other uses (e.g., security or traffic cameras) may be incorporated to allow steering, focusing, and zooming based on location of the cameras and the vehicles. For example, a vehicle, cell phone, PDA, laptop, automated teller machine, or other property with a ranging signal or radio frequency antenna (e.g., LoJack) is stolen. Police may activate the system so that any cameras with a view of the stolen object steer to view the stolen object automatically based on the position. A picture of the thief and real-time location information may then be used by police. As another example, emergency response vehicle location may be used to obtain images of an accident from multiple angles using different cameras. Suspect cell phones may be tracked. For example, the cell phone of a missing person is tracked and any available cameras are steered to the location of the phone. Radar may be used to determine the position. Cameras are focused on a radar return (say a particular plane on a final approach, on a close parallel runway), or for focusing on autonomous or semiautonomous aerial drones.

In rural settings, a GNSS only, local only, or both positioning system may be used. Cameras are installed as needed, such as on utility poles, reference stations, transmitters or elsewhere. Farming equipment may be operated more efficiently by providing images of a farming implement. Dispatch of emergency or fleet vehicles may be monitored with the cameras.

Figure 6:
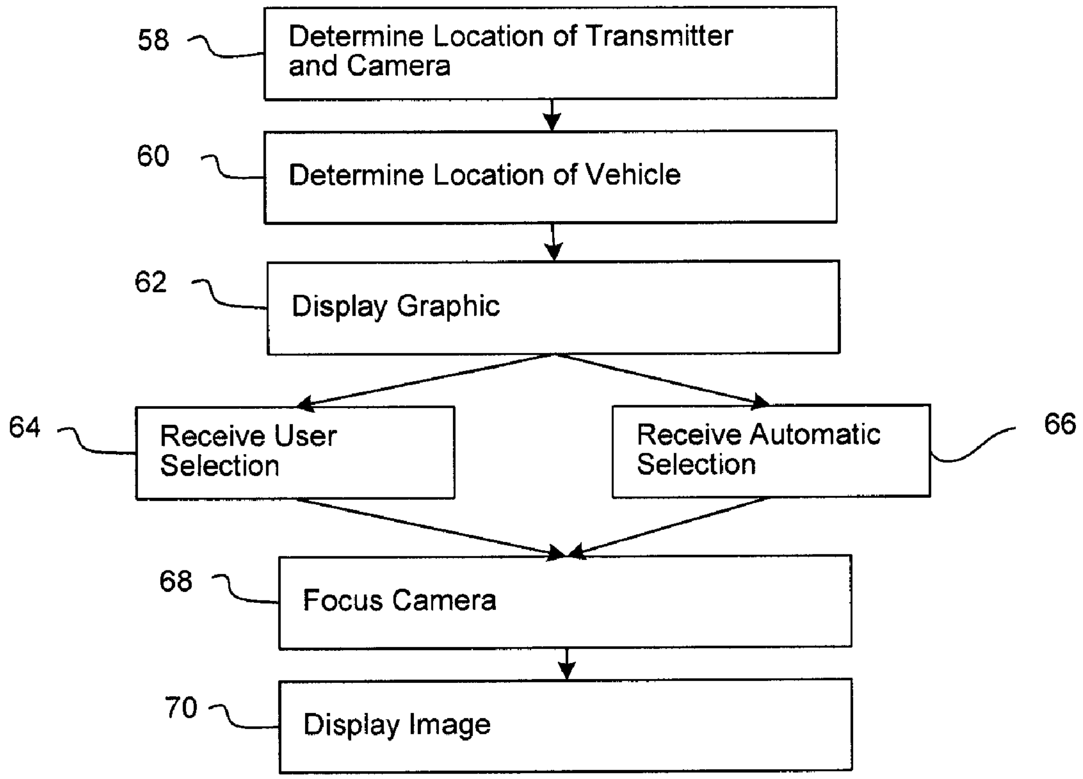
FIG. 6 is a flow chart diagram of one embodiment of a method for visual tracking.

FIG. 6 shows a flow chart of one embodiment of a method for imaging with a camera. The position of a vehicle or other object is determined. One or more cameras steer, focus, and/or zoom to view the object using the position information. The method is performed using the systems described above or different systems. The method is performed in the order shown or a different order. Additional, different or fewer acts may be provided, such as not performing the display of a graphic in act 62. Acts 64 and 66 may both be used or are alternatives.

The method is performed for dispatching or managing vehicles in an open-pit mine. Other environments may use the method, such as in a city, construction site, airport, in rural areas, or in a stadium. The examples below use vehicles, but other objects may be used.

In act 58, the locations of a transmitter and camera are determined. In one embodiment, the locations of a plurality of transmitters and cameras are determined.

In act 60, a location of a vehicle is determined. In one embodiment, the locations of a plurality of vehicles are determined. The positions of tens or even hundreds of vehicles may be determined.

The positions are determined with radio frequency information. For example, radio frequency ranging signals are used to determine the locations of managed or other vehicles. GNSS ranging signals may be used. In one embodiment, land-based transmitters are used to transmit the radio frequency ranging signals to the vehicles. A ranging signal is generated from each land-based transmitter with line of sight to a given vehicle. The ranging signals are generated in response to signals from an oscillator. In one embodiment, the oscillator is unsynchronized with any remote oscillator, but may be synchronized in other embodiments. The ranging signals have a code and a carrier wave. By mixing the code with the carrier wave, each ranging signal is generated. The code may be further modulated with a binary data signal. Other techniques may be used for generating the ranging signals.

For each land-based transmitter, the ranging signal with the code and carrier wave is transmitted. After amplification, the ranging signal is applied to an antenna for transmission. A ranging signal has any of the various characteristics. For example, the ranging signal has a modulation rate of the code of greater than or equal to 30 MHz. In one embodiment, the ranging signal has a modulation rate of the code being at least about 50 MHz. The code has a code length in space approximately equal to a longest dimension of a region of operation of a local positioning system. For example, the region of operation in space is less than about 15 kilometers. The code length is more or less than the region of operation, such as being slightly longer than the region of operation in space. The transmitter ranging signals have a carrier wave in the X or ISM-band. For example, the ranging signals are transmitted as an X-band signal with about 60, 100, or up to 500 MHz of bandwidth. In one embodiment, the bandwidth is about twice the modulation rate of the code. For ISM-band carrier waves, the bandwidth may be less, such as 50 MHZ, 60 MHZ or less. The ranging signals are transmitted in a time slot with a blanking period. Ranging signals from different land-based transmitters are transmitted sequentially in different time slots. Each time slot is associated with a blanking period, such as a subsequent time slot or a period provided within a given time slot. The blanking period corresponds to no transmission, reduced amplitude transmission and/or transmission of noise, no code or a different type of signal. By transmitting the code division multiple access ranging signals in a time division multiple access time slots, a greater dynamic range may be provided. The blanking period is about as long as the code length. The codes from different transmitters have a substantially equal length within each of the different time slots. The corresponding blanking periods also have substantially equal length. The blanking period may have duration substantially equal to the longest code of all of the transmitted ranging signals in a temporal domain. Various time slots and associated transmitters are synchronized to within at least three microseconds, but greater or lesser tolerance may be provided. The synchronization for the time division multiple access prevents interference of one transmitter from another transmitter. Ranging signals with other characteristics and/or formats may be used.

The local ranging signals are received at a mobile receiver. For example, code division multiple access radio frequency ranging signals in an X or ISM-band are received. Alternatively or additionally, local ranging signals in a GNSS-band are received. The ranging signals are also received at a reference station or a second receiver spaced from the mobile receiver. The second receiver may be co-located with a land-based transmitter or spaced from all land-based transmitters. By receiving the signals at two different locations, a differential position solution may be used.

{The receiver generates a plurality of replica spread spectrum codes corresponding to the received codes. The coding is used to identify one given transmitter from another transmitter. Alternatively, time slot assignments are used to identify one transmitter from another transmitter so that a same or different code may be used.

The local positioning system may be augmented by receiving GNSS signals in a different frequency band. The GNSS signals may be received at one receiver or two or more receivers for differential position determination. Different antennas are used for receiving the different frequency signals. For example, one or more microstrip patch antennas are used for receiving GNSS signals. GNSS signals may be used to determine a range with sub-meter accuracy using carrier phase measurements. The augmentation allows determination of the position as a function of satellite signals as well as local positioning signals. Differential and/or RTK measurement of satellite signals may have a carrier wave based accuracy of better than 10 cm.

A position is determined as a function of ranges from a plurality of transmitters. Given the signal structure, a range is determined as a function of a non-differential code phase measurement of the detection and tracking codes. The detection and tracking codes are either the same or different. The position may be determined within sub-meter accuracy using the local positioning system signals. The ranging signals are received at a substantially same center frequency, and the determination of position is free of required movement of the receiver. For example, the code has an accuracy of better than one meter, such as being better than about 10 cm. Having a chip width of less than 10 meters, sub meter accuracy based on code phase measurements without carrier phase measurements is obtained with local positioning ranging signals.

For determining a more accurate range and corresponding position, a differential measurement is computed at the receiver as a function of different ranging signals from different land-based transmitters. The position is determined as a function of the differential measurements of the ranging signals between different receivers. For differential position solutions, information responsive to ranging signals received at one receiver, such as phase measurements or other temporal offset information, is communicated to another receiver.

Any combination of different ranging signals from different land-based transmitters and/or satellites may be used. For differential measurement, a position vector from a reference station to a mobile receiver is determined as a function of ranges or code phase measurements of the reference station relative to the mobile receiver to the land-based transmitters. A position is determined whether or not the mobile receiver is moving. Any combination of uses of ranging signals for determining position may be used, such as providing different position solutions based on a number of land-based transmitters and satellites in view.

In one embodiment, temporal offset information for differential positioning is transmitted using a wireless communication device in broadcast or direct fashion to one or more mobile receivers. In another embodiment, the temporal offset information is transmitted back to one or more of the land-based transmitters. Subsequent ranging signals transmitted from the transmitters are responsive to the temporal offset information. A different communications path than provided for the ranging signals is used to receive the temporal offsets, such as a wireless non-ranging communications path. Frequencies other than the X-band and/or ISM-band are used. Alternatively, a same communications path is used.

In act 62, a graphical representation of location is shown. For example, a map includes flags or icons representing the locations of vehicles. The graphical representation may include other information, such as an identity, type of vehicle, destination, or dispatch information. As the vehicles change position, the position of the corresponding graphical representation changes. In alternative embodiments, the positions are shown without a map. In other embodiments, the positions are not shown relative to each other. For example, a table or list of vehicles and the corresponding positions is provided.

In act 64, a user selection of the graphical representation or vehicle is received. The user selects a vehicle by selecting the graphical representation, inputting a vehicle identifier, selecting from a list, or other input. This input is received electronically and associated with the vehicle or vehicles of interest.

In act 66, the selection of the vehicle is automatic. Without specific user selection of the vehicle, an algorithm selects the vehicle. For example, an autonomous vehicle operation system triggers a safety stop or proximity alert. Other measurements or sensors may trigger selection. The system selects the vehicle associated with the received trigger.

In act 68, one or more cameras are focused, steered, aimed, and/or zoomed to the selected vehicle. The focus and zoom use the distance from a known location of each camera to the location of the vehicle. The steering uses the location of the camera and the location of the vehicle to direct the camera at the vehicle.

In one embodiment, the cameras are positioned adjacent to land-based transmitters. The land-based transmitters have known locations. The location of the camera is at a set or surveyed offset from the transmitter.

In act 70, one or more images from a respective one or more cameras are displayed. The images are views of the selected vehicle or vehicles. For example, images of views from different angles relative to a vehicle are displayed. Images from two or more sides, such as four sides, of a dispatched vehicle are shown. Different numbers of cameras may be directed depending on the selection or indication of a reason for the selection. Different cameras may be selected to provide the desired diversity of views or viewing from a desired angle.

In one embodiment, camera images and/or location information are automatically recorded after a proximity alert or safety stop has been triggered, for future safety analysis or investigation.

The cameras are steered, focused, and/or zoomed in response to the user selection of act 64, the automatic selection of act 66, or other event. Other events include different modes of operation of the steering of the cameras. For example, the cameras steer to scan along one or more roads. Each camera scans a different road and/or location, or more than one camera may scan along a same road or point to a same location. As another example, the cameras are steered to view different vehicles. A given camera steers to one vehicle, then another, and so on in a cyclical pattern. Other cameras steer to the same or other vehicles in a cyclical, hopping pattern. Different cameras show different vehicles at a given time. In another example, one or more of the cameras steer to view infrastructure or non-moving objects.

In one embodiment, a request for in-vehicle display of a view of a vehicle is received. For example, the operator of a dispatched vehicle hears a noise or receives a warning. In response, the operator requests an image of the outside of the vehicle. One or more cameras are steered, zoomed, and/or focused on the vehicle or to a region adjacent to the vehicle. The resulting image or images are transmitted to the vehicle for display in the vehicle. The operator may resolve the concern or request assistance as needed without having to stop and/or exit the vehicle.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for using positioning information to image vehicles in an open-pit mine, the system comprising:

a plurality of land-based transmitters at different known locations in or by the open-pit mine;

a plurality of cameras each steerable along at least two axes, the cameras positioned at or by respective land-based transmitters such that updates for the known locations of the land-based transmitters correspond to camera locations, the cameras operable to zoom;

a management processor operable to determine locations of a plurality of vehicles in or by the open-pit mine as a function of signals transmitted from the land-based transmitters at the known locations and received at the vehicles; and a display operable to display a graphical representation of the locations of the vehicles;

wherein the management processor is operable to steer the plurality of cameras to a first one of the vehicles and to zoom the plurality of cameras as a function of distances from the cameras to the first one of the vehicles, and wherein the display is operable to display images from the plurality of cameras, the images showing the first one of the vehicles from different angles such that four sides of the first one of the vehicles are shown in the images.

2. The system of claim 1 wherein the plurality of land-based transmitters connects with a respective plurality of masts, one of the cameras connected to each of the masts.

3. The system of claim 1 wherein the plurality of land-based transmitters and cameras are distributed around or within the open pit mine such that at least four cameras and land-based transmitters have line of sight to all possible locations for the vehicles.

4. The system of claim 1 wherein the management processor is part of a graphical dispatch system having a user input, wherein the management processor is operable to steer in response to user selection of a first one of the graphical representations corresponding to the first one of the vehicles.

5. The system of claim 1 wherein the management processor is operable to steer the plurality of cameras to scan along one or more roads in a road scan mode and to substantially continuously switch between views of different ones of the vehicles in a vehicle hopping mode, the road scan and vehicle hopping modes corresponding to the cameras viewing different areas of the open-pit mine at a same time, wherein the management processor being operable to steer the plurality of cameras to the first one of the vehicles and to zoom the plurality of cameras corresponds to multiple cameras viewing the first one of the vehicles at a same time in response to a trigger in a trigger mode.

6. The system of claim 1 wherein the management processor is operable to steer and zoom the plurality of cameras to the first one of the vehicles in response to automatic detection of the first one of the vehicles being in proximity to an obstruction, another vehicle, a feature of the open pit mine, road condition, or combinations thereof.

7. The system of claim 1 wherein the first one of the vehicles is operable, at least in part, autonomously, the management processor operable to steer and zoom the plurality of cameras to the first one of the vehicles in response to a safety stop of the first one of the vehicles, and the management processor operable to receive an indication of a manual override of the safety stop and output the indication to the first one of the vehicles.

8. The system of claim 1 wherein the cameras comprise thermal cameras, infrared cameras, night vision cameras, or combinations thereof.

9. The system of claim 1 wherein the management processor is operable to steer and zoom at least one of the cameras to view at least one of the land-based transmitters, a reference station for location determination, fixed open-pit mine facilities, communications infrastructure, or combinations thereof.

10. The system of claim 1 further comprising a wireless communications network, the cameras operable to transmit the images over the wireless communications network to the management processor and the vehicles operable to transmit position information to the management processor over the wireless communications network.

11. The system of claim 1 wherein the management processor is operable to update the steering and zooming of the cameras as a function of changes in the location of the first one of the vehicles.

12. The system of claim 1 wherein a second one of the vehicles comprises a in-vehicle display and a vehicle user input, the management processor operable to steer and zoom at least one of the cameras to view the second one of the vehicles in response to a request from the vehicle user input and transmit an image of the view of the second one of the vehicles to the in-vehicle display.

13. The system of claim 1 wherein the management processor is operable to steer and zoom the cameras to the first one of the vehicles in response to a detected deviation in operating parameters of the first one of the vehicles.

14. A system for imaging with a camera, the system comprising:

a camera steerable along at least a first axis;

a user input operable to receive a user indication of selection of at least a first one of a plurality of mobile vehicles;

a display operable to display a representation for at least the first one of the mobile vehicles on a map, the first one of the mobile vehicles having a dynamically determined position; and a processor operable to steer the camera to view the first one of the mobile vehicles in response to the user indication, the camera steered as a function of the dynamically determined position of the first one of the mobile vehicles, wherein the processor is further operable to steer the camera to scan along one or more roads when in a road scan mode, to steer the camera to substantially continuously switch between views of different ones of the mobile vehicles when in a vehicle hopping mode, and to steer the camera to view infrastructure.

15. The system of claim 14 wherein the dynamically determined position is a satellite-based radio frequency determined position, and wherein the map corresponds to a local region for the determined position.

16. The system of claim 14 wherein the display and the processor are part of a dispatch system, wherein the mobile vehicles comprise fleet vehicles having wireless communications with the dispatch system, and wherein the camera is one of a plurality of cameras and wherein the processor is operable to steer and zoom the plurality of cameras to view the first one of the mobile vehicles.

17. The system of claim 14 further comprising:

land-based transmitters, wherein the camera is positioned on a mast with one of the land-based transmitters, the dynamically determined position being a function of signals from the land-based transmitter.

18. The system of claim 14 wherein the dynamically determined position comprises a position determined from radio communications.

19. The system of claim 14 wherein the dynamically determined position comprises a position determined from radio frequency ranging signals.

20. A method for imaging with a camera, the method comprising:

determining locations of a plurality of managed vehicles with radio frequency ranging;

displaying a graphical representation of the locations and types of the plurality of managed vehicles;

focusing, steering, and zooming, automatically, a plurality of cameras on a first one of the plurality of managed vehicles as a function of the location of the first one of the managed vehicles, wherein steering includes providing a plurality of camera steering modes, including steering the plurality of cameras to scan along one or more roads, steering the plurality of cameras to view different ones of the managed vehicles at a same time and switching the different ones of the managed vehicles being viewed, and steering the plurality of cameras to view infrastructure; and displaying images from the cameras of the first one of the managed vehicles.

21. The method of claim 20 wherein the cameras are positioned adjacent to land-based transmitters having known locations, the focusing, steering, zooming, or combinations thereof being a function of the known location associated with the camera and the location of the first one of the managed vehicles, and wherein determining comprising determining as a function of signals from the land-based transmitters.

22. The method of claim 20 wherein focusing, steering, zooming, or combinations thereof comprises steering and zooming, and wherein displaying the images comprises displaying the images from different angles such that four sides of the first one of the managed vehicles are shown in the images.

23. The method of claim 20 further comprising:

receiving user input of a selection of the graphical representation of the first one of the managed vehicles, wherein focusing, steering, zooming, or combinations thereof is performed in response to receiving the user input.

24. The method of claim 20 further comprising:

receiving a proximity alert or safety stop associated with the first one of the managed vehicles;

wherein focusing, steering, zooming, and combinations thereof is performed in response to the receipt of the proximity alert.

25. The method of claim 20 further comprising:

receiving a request for in-vehicle display of a view of the first one of the managed vehicles; and transmitting at least one of the images to the first one of the managed vehicles.

26. The method of claim 20 wherein managed vehicles comprise dispatched vehicles, each of the dispatched vehicles having an assigned task.

27. A system for imaging with a camera, the system comprising:

a plurality of land-based transmitters at different known locations, each of the land-based transmitters on a respective mast;

a plurality of steerable cameras, the cameras positioned on the masts; and a processor operable to determine a location of a vehicle as a function of signals transmitted from the land-based transmitters to the vehicle, and operable to steer the cameras to view a vehicle as a function of the location, wherein the processor is further operable to update camera locations of the steerable cameras, the camera locations being laterally determined along three axes, wherein the processor determines distances and angles of the vehicle location relative to the camera locations, and wherein the processor steers and focuses the cameras as a function of the distances and angles.

28. The system of claim 27 further comprising a display operable to display an icon for the vehicle on a map, and wherein the processor is operable to steer in response to user selection of the icon.

29. The system of claim 27 wherein determining the location of the vehicle comprises determining as a function of radio frequency ranging signals.

30. The system of claim 27 wherein the processor is operable to update by determining the camera locations as a function of radio frequency ranging signals.

31. The system of claim 27 wherein the processor is with one of the cameras.

32. A method for imaging with a camera, the method comprising:

determining locations of a plurality of managed vehicles with radio frequency ranging;

displaying a graphical representation of the locations and types of the plurality of managed vehicles;

focusing, steering, zooming, or combinations thereof, automatically, a plurality of cameras on a first one of the plurality of managed vehicles as a function of the location of the first one of the managed vehicles;

displaying images from the cameras of the first one of the managed vehicles;

receiving a request for in-vehicle display of a view of the first one of the managed vehicles; and transmitting at least one of the images to the first one of the managed vehicles.

33. The method of claim 32, wherein the plurality of cameras includes a vehicle-mounted camera.

34. The method of claim 32, wherein the first one of the managed vehicles operates autonomously or semi-autonomously.

35. The method of claim 32, wherein displaying images from the cameras further includes displaying images showing the first one of the managed vehicles from different angles such that four sides of the first one of the vehicles are shown in the images.

* * * * *